June 5, 1928. 1,672,569
J. M. JONES ET AL
LOOSE LEAF BINDER
Filed May 10, 1926    2 Sheets-Sheet 1
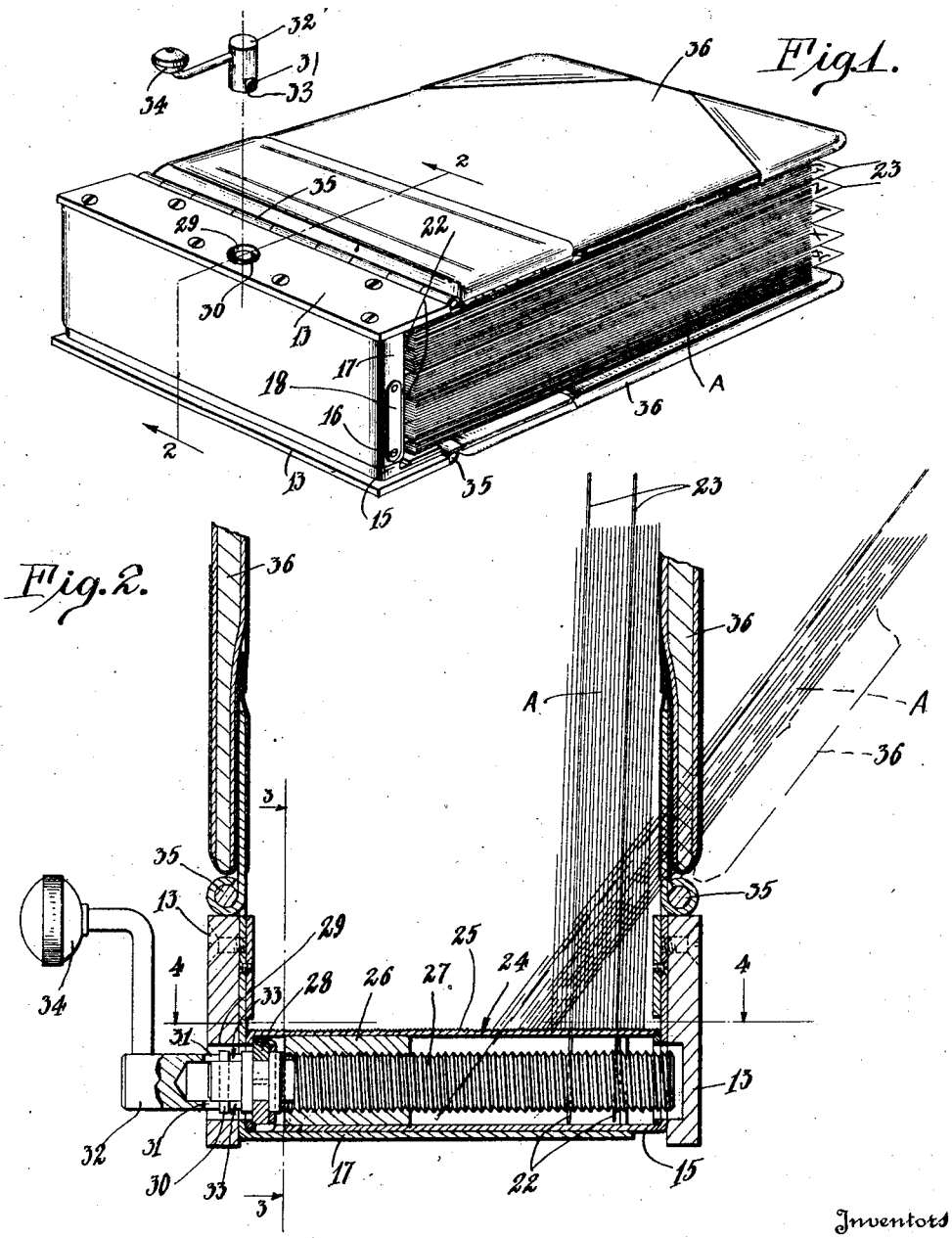
Inventors
Jesse M. Jones
Robert R. Webb
By Lyon & Lyon
Attorneys Patented June 5, 1928.

1,672,569

UNITED STATES PATENT OFFICE.

JESSE M. JONES AND ROBERT R. WEBB, OF LOS ANGELES, CALIFORNIA, ASSIGNORS TO CHARLES R. HADLEY COMPANY, OF LOS ANGELES, CALIFORNIA, A CORPORATION OF CALIFORNIA.

LOOSE-LEAF BINDER.

Application filed May 10, 1926. Serial No. 107,991.

This invention relates to binders of the type in which loose leaves are clamped, and an object of the invention is to provide a binder of this type that can be used to advantage in a tray for facilitating some of the operations of bookkeeping.

Another object is to make provision for expansion and contraction of the binder back.

A further object is to provide a leaf support of sectional construction so that said leaf support will function perfectly whether the binder is contracted or expanded.

Other objects and advantages will appear in the subjoined detailed description.

The accompanying drawings illustrate the invention.

Figure 1 is a perspective view of a loose-leaf binder constructed in accordance with the provisions of this invention, the member for operating the clamping mechanism being also shown aligned with but detached from said mechanism.

Figure 2 is an enlarged vertical section on the line indicated by 2—2, Fig. 1.

Figure 3:
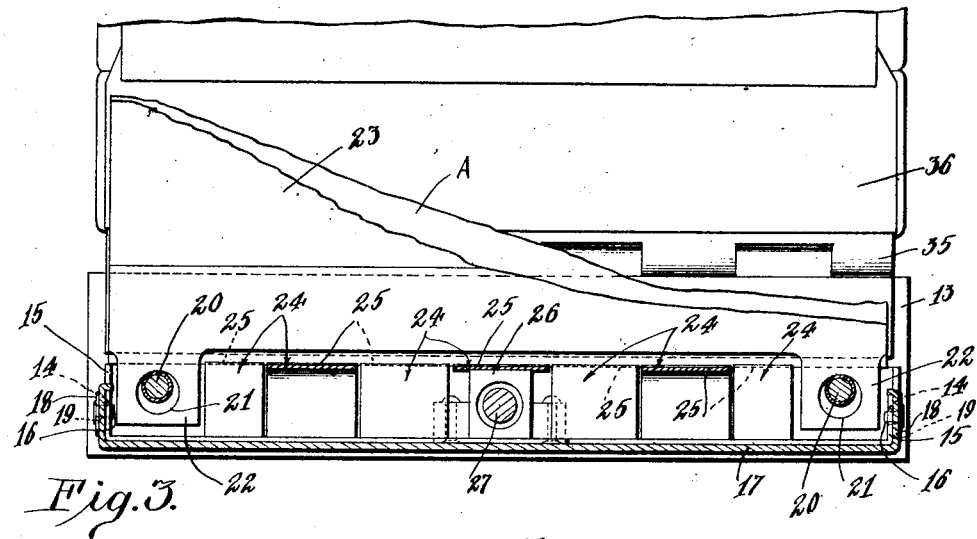
Figure 3 is a sectional view on the line indicated by 3—3, Fig. 2.
Figure 4:
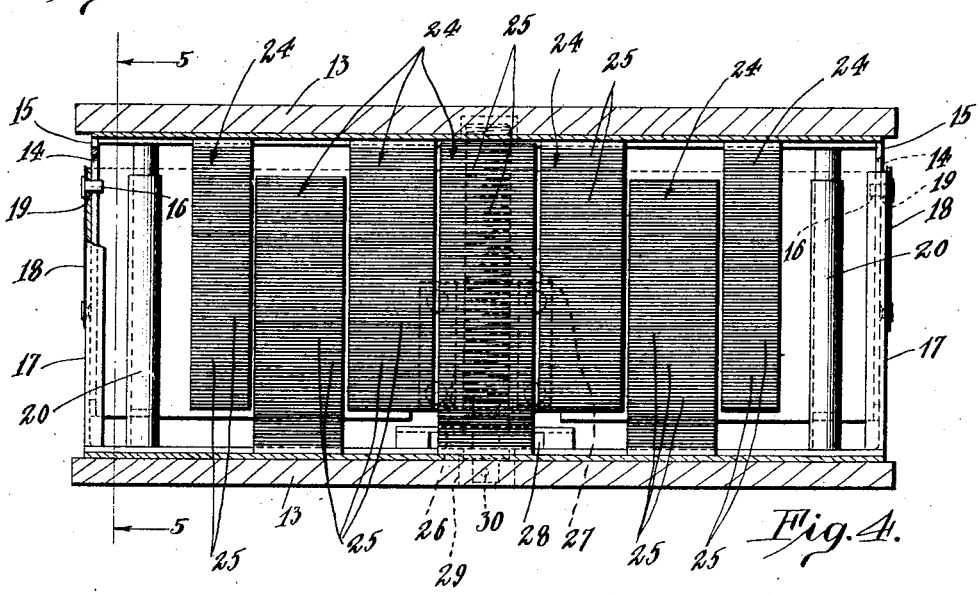
Figure 4 is a horizontal section on the line indicated by 4—4, Fig. 2.
Figure 5:
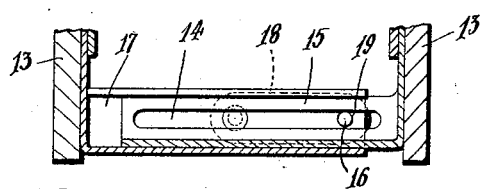
Figure 5 is a sectional detail on the line 5—5, Fig. 4.

There is provided a pair of leaf-clamping members 13 of L-shaped construction, the longer leg of one of the clamping members being slidably connected with the longer leg of the other clamping member, the sliding connection consisting of slots 14 in side flanges 15 of one of the clamping members 13 and studs 16 projecting from flanges 17 of the other clamping member 13, said studs engaging in the slots 14. The clamping members 13 together constitute an adjustable binder back. In this instance, the studs 16 are yieldingly mounted so that they can be retracted from the slots 14. The studs 16, in this instance, are attached to flat springs 18 secured to the flanges 17 and projecting through holes 19 in the flanges 17. The springs 18 yieldingly hold the studs in the slots and the flanges 17 form channels for the flanges 15 to slide in, thus making a telescoping connection between the clamping members 13. To separate the members, all that is necessary is to pull the springs 18 outwardly to withdraw the studs from the slots and then slide the flanges 15 out of the flanges 17.

To the clamping members 13 are secured the opposite ends of telescoping index guide retaining members 20 which are adapted to extend through holes 21 formed in downwardly extending tabs 22 of index guides 23.

The binder back has interfitting leaf-supporting members 24, alternate ones of said members being secured to the different clamping members 13. Thus, the leaf-support is of sectional construction, one of the sections interengaging the other and said sections being in slidable relation so that, when the clamping members 13 are slid in and out relative to each other, the leaf-support is contracted and expanded accordingly. Preferably, the members 24 are provided on their upper faces with transversely extending grooves 25 so as to insure against slippage of the guides and leaves along said members when said guides and leaves are not tightly clamped between the clamping members 13.

To force the clamping members toward and from one another, there is provided suitable means formed, in this instance, by a nut 26 and screw 27, the nut being secured in any suitable manner to one of the members 13 and the screw being rotatably supported by a bearing 28 on the other clamping member 13, said other clamping member being provided with an opening 29 through which the head of the screw projects. Said head is provided with a transversely extending pin 30, the projecting ends of which are adapted to be received in openings 31 in a shaft 32, said pins entering the openings 31 through slots 33. The shaft 32 is thus detachable from the screw and can be readily turned by a crank-handle 34, so as to move the clamping members 13 toward or from one another. Hinged at 35 to the clamping members 13 are covers or leaf supports 36.

The foregoing will enable those skilled in the art to make and use the invention, and the operation may be briefly described as follows:

Assuming that the parts are in the positions shown in Fig. 1 of the drawings, it will be readily understood that the binder may be opened the same as a book in order to inspect the mater on the loose leaves. If it be desired to unclamp the binder so that the leaves may be readily removed and replaced or new leaves added, in the operations of bookkeeping, the operating member will be inserted through the opening 29 with the shaft 32 thereof engaged with the head of the screw 27, as in Fig. 2, and the handle 34 will be turned to open the clamping members 13, thus sliding some of the leaf-supporting members 24 away from others of said members and at the same time moving the clamping members 13 away from each other. As this operation is taking place, the loose leaves A will assume the positions indicated in broken lines in Fig. 2, the bottom edges of said leaves resting in the grooves 25 and thus being prevented from slipping along the leaf-supporting members. This is very important, and no loose-leaf binder has previously been constructed having an adjustable leaf support in combination with an index-guide retaining rod. Thus, it is unnecessary to perforate or slot the loose leaves and the loose leaves are absolutely free when the clamping members are loosened and, accordingly, can be quickly removed and replaced in the binder. By not perforating or slotting the loose leaves, one operation in the manufacture of said loose leaves is avoided and, also, the leaves are not so liable to be torn in the bookkeeping machine in which they are placed for receiving entries. In placing perforated or slotted loose-leaves in the bookkeeping machine, great care must be exercised to avoid tearing them and, accordingly, time is saved by use of the unperforated and unslotted leaves. The index-guide retaining rod anchors the index-guides in the binder and, accordingly, when said index-guides are tightly clamped against the loose-leaves, said loose-leaves cannot bulge and burst from between thec lamping members as would be the case if the index-guides were not securely anchored. In fact, it is impossible to even pull the leaves out of the binder when it is closed.

It is to be understood that it is preferable to support the binder in a suitable tray and this binder has been shown in connection with a tray in our copending application for patent filed May 8, 1926, Serial No. 107,563. In the copending application, the binder is not only supported by the tray but cooperates with said tray in a manner fully described in said application.

As new leaves are added to the binder, said binder may be expanded by turning the shaft 32 so as to further space the clamping members 13.

At the end of a day or at any other desired time, after it is no longer desired to remove or replace the loose leaves, the shaft 32 will be operated to close the clamping members together and said shaft will then be detached from the screw 27 and the binder may then be placed in a vault or any other desired location.

It is to be particularly noted that by clamping the leaves with the means disclosed above, it is unnecessary to perforate said leaves as is the usual practice where loose leaves are held in a binder of this type.

The leaf-supporting members, it is to be noted, lie in a plane above the level of the telescoping index-guide retaining members 20 and the index-guides 23 project below the level of said plane to engage the members 20 while the loose leaves rest with their bottom edges on the leaf-suporting members and are thus held free of the members 20.

We claim:

1. A loose-leaf binder comprising clamping members, telescoping index guide retaining members secured at their opposite ends to the clamping members, and interfitting leaf-supporting members of which some are connected to one of the clamping members and some to another of the clamping members.

2. A loose-leaf binder comprising slidably connected clamping members, telescoping index guide members secured at their opposite ends to the clamping members, and a leaf-supporting member secured to one of the clamping members and lying in a plane above the level of the guide members.

3. A loose-leaf binder comprising slidably connected clamping members, telescoping index guide members secured at their opposite ends to the clamping members, and leaf-supporting members lying in a plane above the level of the guide members, alternate ones of said leaf-supporting members secured to the respective clamping members.

Signed at Los Angeles, California, this 29 day of April 1926.

JESSE M. JONES.
ROBERT R. WEBB.